United States Patent
Bink et al.

(10) Patent No.: US 10,465,913 B2
(45) Date of Patent: Nov. 5, 2019

(54) BURNER MODULE PROVIDED WITH HEAT SHIELD AND BUSH, COOKER OR HOB PROVIDED THEREWITH AND METHOD FOR MANUFACTURE THEREOF

(71) Applicant: PCS Holding B.V., De Meern (NL)

(72) Inventors: Maikel Bink, Woerden (NL); Paulus Johannes Maria Van de Kooi, Amersfoort (NL)

(73) Assignee: PCS Holding B.V., De Meern (NL)

( * ) Notice: Subject to any disclaimer, the term of this patent is extended or adjusted under 35 U.S.C. 154(b) by 245 days.

(21) Appl. No.: 15/531,680

(22) PCT Filed: Nov. 30, 2015

(86) PCT No.: PCT/NL2015/050834
§ 371 (c)(1),
(2) Date: May 30, 2017

(87) PCT Pub. No.: WO2016/085346
PCT Pub. Date: Jun. 2, 2016

(65) Prior Publication Data
US 2018/0283697 A1 Oct. 4, 2018

(30) Foreign Application Priority Data

Nov. 28, 2014 (NL) .................................... 2013898
Dec. 3, 2014 (NL) .................................... 2013912
Jun. 11, 2015 (NL) .................................... 2014954

(51) Int. Cl.
*F24C 3/08* (2006.01)
*B23P 19/04* (2006.01)
(Continued)

(52) U.S. Cl.
CPC .............. *F24C 3/085* (2013.01); *B23P 19/04* (2013.01); *F23D 14/06* (2013.01); *F23D 14/76* (2013.01)

(58) Field of Classification Search
CPC .... F24C 3/08; F24C 3/12; F24C 3/085; F24F 15/107
(Continued)

(56) References Cited

U.S. PATENT DOCUMENTS 4,354,478 A * 10/1982 Contini .................. F24C 3/085
126/39 E
4,616,626 A 10/1986 Kwan
(Continued)

FOREIGN PATENT DOCUMENTS

BE 403986 7/1934
BE 442878 10/1941
(Continued)

*Primary Examiner* — Gregory A Wilson
(74) *Attorney, Agent, or Firm* — Marcus C. Dawes (57) ABSTRACT

The present invention relates to a burner module for a cooker or hob, the cooker or hob or kitchen provided therewith and method therefor. The burner module according to the invention comprises a carrier arranged under the worktop of the cooker and provided with a gas inlet and a gas outlet, a burner operatively connectable to the carrier, a heat shield arranged during use under and/or around the burner, and a bush provided with a flange arrangeable in an opening in the worktop, wherein the flange rests on or in the worktop.

19 Claims, 10 Drawing Sheets

(51) Int. Cl.
*F23D 14/06* (2006.01)
*F23D 14/76* (2006.01)

(58) Field of Classification Search
USPC .............. 126/38, 39 E, 39 B, 40, 42, 214 A; 431/127, 142, 154, 354
See application file for complete search history.

(56) References Cited

U.S. PATENT DOCUMENTS

| | | | | |
|---|---|---|---|---|
| 6,712,605 | B2* | 3/2004 | Moresco | F23D 14/06 126/39 E |
| 7,895,999 | B2* | 3/2011 | Graham | F23D 14/105 126/215 |
| 8,307,817 | B2* | 11/2012 | Dorwarth | F23D 14/06 126/39 BA |
| 10,197,292 | B2* | 2/2019 | Van Der Sluis | F24C 3/085 |
| 2010/0092902 | A1* | 4/2010 | Paesani | F23D 14/065 431/354 |
| 2012/0152231 | A1* | 6/2012 | Van Der Sluis | F24C 3/085 126/39 E |
| 2015/0040887 | A1* | 2/2015 | Angulo | F24C 3/08 126/39 E |

FOREIGN PATENT DOCUMENTS

| | | |
|---|---|---|
| DE | 9315763 | 4/1994 |
| EP | 969253 A2 * | 1/2000 |
| EP | 2381 175 | 10/2011 |
| EP | 2602552 | 6/2013 |
| FR | 554116 | 6/1923 |

\* cited by examiner

PRIOR ART

BURNER MODULE PROVIDED WITH HEAT SHIELD AND BUSH, COOKER OR HOB PROVIDED THEREWITH AND METHOD FOR MANUFACTURE THEREOF

BACKGROUND

Field of the Technology

The present invention relates to a burner module for a hob or cooker, such as a gas cooker.

Description of the Prior Art

Hobs or cookers known in practice usually comprise a worktop in which a large rectangular recess is provided. Arranged at this position in the hob or cooker is a rectangular plate of largely corresponding dimensions in which outlets or gas rings are provided. The required connections are realized at this position on the underside of this plate so as to provide a functioning hob or cooker.

Known from WO 2010/143952 is a burner module which can be arranged as a unit on a worktop and with which a greater flexibility in the positioning of the burner on the worktop is obtained. In addition, this burner module can be placed as a unit on or in a worktop, wherein the burner module is inserted for the greater part from below through the worktop during mounting thereof. A heat plate or heat shield is then placed onto the worktop from above and fixed to the substructure unit, and supports against the upper surface of the worktop so as to thereby provide a fixation of the burner module relative to the worktop.

Conventional burner modules and cookers or hobs are exposed to high temperatures and consequently relatively large differences in temperature. The worktop must therefore be able to withstand these high temperatures and large temperature differences. This limits the flexibility in the choice of worktop materials and worktop dimensions employed, such as worktop thickness.

BRIEF SUMMARY

The present invention has for its object to provide a burner module for a hob or cooker which obviates or at least reduces the above stated problems.

This object is achieved with the burner module for a cooker or hob according to the present invention, the burner module comprising:
- a carrier arranged under the worktop of the cooker and provided with a gas inlet and a gas outlet;
- a burner operatively connectable to the carrier;
- a heat shield arranged during use under and/or around the burner; and
- a bush provided with a flange arrangeable in an opening in the worktop, wherein the flange rests on or in the worktop.

In the context of the present invention a cooker is also understood to mean a hob. Where reference is made to a cooker in the further course of the application, this should also be understood to mean a hob.

During placing the burner module according to the invention is preferably arranged from the underside of the worktop, wherein the outlet protrudes through openings provided in the worktop. In a currently preferred embodiment the burner module is placed as unit on the worktop so that further fitting operations at the location of use can thereby be avoided. Worktops can be assembled from for instance stainless steel, glass, concrete, terrazzo, natural stone, diverse types of wood and combinations thereof, as well as other suitable materials.

The burner module according to the invention results in it being possible to realize a cooker wherein the outlets or gas rings are mounted directly onto the worktop such that a cooker liner or cooker plate on which these outlets or gas rings are provided is not required. This not only limits the materials required, a greater flexibility in the configuration of the cooker is for instance also provided, whereby a sleeker design and other advantages are possible. In addition, cleaning and keeping the cooker clean are hereby improved.

The burner module comprises a carrier preferably manufactured from a galvanized material. The carrier preferably comprises gas conduits from the inlet to the gas valve and from this valve to the outlet or gas ring. The outlet or gas ring of the burner module is preferably supplied here with a combustible gas, preferably natural gas, which can come from a gas conduit or gas bottle. In a currently preferred embodiment an ignition module is accommodated in a galvanized bottom tray of the carrier for the purpose of realizing a gas flame therewith. Other embodiments are likewise possible according to the invention.

The burner module according to the invention is further provided with a heat shield arranged in use under and/or around the burner. In a currently preferred embodiment this heat shield is embodied as an enamelled steel plate which in use supports downward onto the worktop with a bent edge or flange, wherein a rubber ring or other sealing ring is provided between the heat shield and the worktop. The heat shield is preferably connected to the carrier on the underside of the worktop. This connection is preferably realized as soon as the carrier with burner is inserted through the opening in the worktop and the heat shield is secured to the carrier from above such that the burner is fixed. On the upper side of the worktop an enamelled steel pan support is usually provided around the outlet or gas ring of the burner for the purpose of positioning a pan for heating relative to this outlet or gas ring. The pan support is preferably provided with a solid, substantially horizontal ring of preferably increasing diameter on which support surfaces are more preferably arranged as direct support for the pan.

The burner module according to the invention is further provided with a bush on which a flange is arranged, wherein the bush can be arranged in an opening in the worktop and the flange rests on or in the worktop. Providing a bush realizes a screening between the burner and the worktop. The bush particularly screens a burner space. The burner space is formed by the space between the gas ring or outlet of the burner module and the carrier arranged on the underside of the worktop and bounded in lateral direction by substantially the opening arranged in the worktop. The bush hereby realizes a significant reduction in the transfer of heat to the worktop such that the temperature of the worktop will not rise too high and damage to the worktop will not occur, including for instance cracking of the worktop as a result of excessive differences in temperature. In use the bush extends substantially in a vertical direction, wherein according to the invention the flange is provided on or close to the upper edge. The bush is preferably arranged freely in the opening in the worktop, and therefore preferably not fixed to the carrier module. Surprisingly, it has been found that it is not necessary either to screw the bush to the worktop as alternative to the bush being screwed to the carrier. This further reduces assembly operations.

In the burner module according to the invention the bush and the heat shield laterally enclose the above stated space under the burner during use. The heat shield is preferably arranged such that this burner space is also screened on the side of the burner space facing upward during use.

Heat transfer by means of convection from the burner space to the worktop as well as by radiation from hot components of the burner module, and preferably other components including for instance the pan support, to the worktop is avoided or at least greatly reduced by providing the combination of heat shield and bush. The rise in temperature of the worktop during use of the burner module hereby remains limited, so that damage is avoided.

It has additionally been found that not only does the rise in temperature remain limited, the temperature differences occurring in the worktop are also greatly reduced. Damage to the worktop is hereby significantly reduced. The option is also provided of using other types of material for the worktop and/or applying other worktop thicknesses. The flexibility in the materials and dimensions to be used is hereby greatly increased using the burner module according to the invention. Furthermore and/or additionally, material costs can be further reduced such that a cost-effective cooker provided with at least one burner module according to the invention is provided.

The bush and the heat shield are preferably configured such that the burner space, as discussed above, is screened laterally from the worktop. The burner space is preferably wholly screened from the worktop. Air from the burner space cannot therefore enter into direct contact with the worktop, so that heat transfer as a result of this contact is avoided.

It has been found that a significant reduction in temperature increase is hereby achieved during use of the burner module, as well as a great reduction in the temperature differences which occur. This enhances the above stated advantages. The lateral screening of the worktop is preferably provided by having the heat shield and the flange of the bush connect to each other, optionally by means of a sealing ring placed therebetween. Contact between air from the burner space and the worktop is hereby wholly avoided.

In an advantageous preferred embodiment according to the present invention a substantially horizontal surface of the heat shield is provided at a distance relative to the surface of the worktop.

Providing the heat shield, or at least a substantially horizontal surface thereof, at a vertical distance relative to the surface defined by the upper side of the worktop further reduces heat transfer between the burner module and the worktop.

The distance preferably lies in the range of 10-20 mm, preferably in the range of 11-18 mm and most preferably in the range of 12-15 mm. It has been found that the range of 12-15 mm in particular achieves an effective and adequate reduction in heat transfer.

In a further advantageous preferred embodiment according to the invention the heat shield is provided with an additional edge on or close to the outer edge of the heat shield.

In a currently preferred embodiment a kind of step shape is provided for the heat shield by providing an additional edge. Using the additional edge a further screening of the worktop is realized, whereby particularly heat transfer by radiation from the pan support to the worktop is reduced. The edge is preferably formed by forming two additional bent portions on the heat shield, thereby realizing the above stated step shape.

The additional edge of the heat shield is preferably configured such that in use it is provided under at least a part of the pan support. Having the additional edge extend under the pan support, or at least a significant part thereof, achieves that the radiant heat from the pan support toward the worktop is reduced. This further reduces the increase in temperature occurring at the worktop during use of a burner module. In addition, the difference in temperature which occurs is hereby also reduced. Furthermore, it is hereby possible to provide the opening or recess in the worktop with a larger diameter. This achieves a further reduction in temperature increase during use of the burner module. This is realized by the greater screening of the worktop from heat/flames because of the preferably larger diameter of the heat shield realized with the additional edge. In addition, a larger diameter of the opening decreases the absorption of heat by the worktop.

In a further advantageous preferred embodiment according to the present invention the burner is operatively connected to the control knob. Providing a control knob allows the burner module to be operated by a user. The control knob is preferably provided with a housing of increased height. By lengthening the housing of the control knob through a vertical distance in use a greater tolerance is obtained in adjusting the height of the control knob. Such a knob usually has to be pressed in during ignition of the burner in order to provide the safety means of the burner with a signal. The underside of the knob must not protrude above the liner here in rest position. Lengthening the housing of the control knob creates more space to enable the control knob to be pressed in over a desired distance during ignition of the burner, and the burner going out after release of the control knob is for instance avoided. In a currently preferred embodiment the knob is also lengthened to some extent as well as the housing in order to avoid the possibility of the underside of the knob protruding above the housing. An effective operation of the burner module according to the present invention is in this way achieved.

According to the present invention diverse modules can be connected to the carrier, in particular gas rings, although use of an iron plate for frying in teppanyaki style and/or grilling on a grill plate are also possible.

In a further advantageous preferred embodiment according to the present invention the carrier is provided with a support or guide configured for supporting attachment to a wall.

Connecting the carrier in supporting manner to a side wall during use, for instance a side wall of the cooker or kitchen cabinet, achieves that the carrier does not exert any forces on the worktop. This avoids (compressive) stress on the worktop.

The invention further relates to a cooker or hob provided with a burner module as described above.

Such a cooker or hob provides the same effects and advantages as those stated in respect of the burner module. At least some of the burner modules are preferably provided with a pan support. It has been found here that, because of the use of the combination of heat shield and bush provided with flange a good screening of the burner space from the worktop is realized. In a possible embodiment with an additional edge for the heat shield, the pan support is also further separated from the worktop, whereby heat transfer is reduced.

The invention further relates to a kitchen provided with a cooker or hob with a number of burner modules as described above.

Such a kitchen provides the same effects and advantages as those described in respect of the burner module and cooker or hob.

The invention also relates to a method for manufacturing a cooker or hob, the method comprising the steps of:
 providing a worktop;
 arranging a number of openings in the worktop;
 arranging in an opening a burner module as described above, wherein the flange of the bush rests during use on or in the worktop; and
 connecting a burner module.

Such a method provides the same effects and advantages as those stated in respect of the burner module, the cooker or hob and kitchen. The burner module is preferably inserted through the worktop from below during mounting thereof. The heat shield is connected to the carrier such that the burner module is positioned relative to the worktop. An effective assembly in this way becomes possible with a small number of operations which need to be performed in situ. A DIY enthusiast can in this way also perform the method in efficient and safe manner.

BRIEF DESCRIPTION OF THE DRAWINGS

Further advantages, features and details of the invention are elucidated on the basis of preferred exemplary embodiments thereof, wherein reference is made to the accompanying drawings, in which.

DETAILED DESCRIPTION OF THE PREFERRED EMBODIMENTS

Burner module 2 (FIG. 1) is arranged in or on worktop 4. A galvanized lower tray or carrier 6 is provided under worktop 4. In the shown embodiment worktop 4 is given a thickness of about 30 mm. Provided in the shown embodiment in the space between the underside of worktop 4 and carrier 6 is an aluminium heat-conductive plate 8 about 5 mm thick which is placed against the underside of worktop 4. Burner 10 is provided with outlet 12. Burner module 2 is operated with control knob 14. In the shown embodiment knob 14 is of an anodized aluminium material and provided on the upper side of worktop 4. Provided around outlet or gas ring 12 is an enamelled steel pan support 16 which in the shown embodiment has four support parts 18 for supporting a pan and is provided with ring 20 with an inclining upper surface, which in the shown embodiment slopes downward in the direction of gas ring 12. Pan support 16 supports with support surface 24 on worktop 4 and with support surface 26 against flange 28 of heat shield 30. Flange 28 is provided in the shown embodiment with sealing ring 32 and placed therewith on worktop 4. Heat shield 30 is further provided with a substantially horizontal surface 34 which is provided in the shown embodiment with an inclining edge 36 and central part 38. In the shown embodiment heat shield 30 is provided with three bent portions. Also provided is bush 40 which, using flange 42, rests on worktop 4. In the shown embodiment an outer edge of flange 42 lies against sealing ring 32 of flange 28 of heat shield 30.

Figure 1:
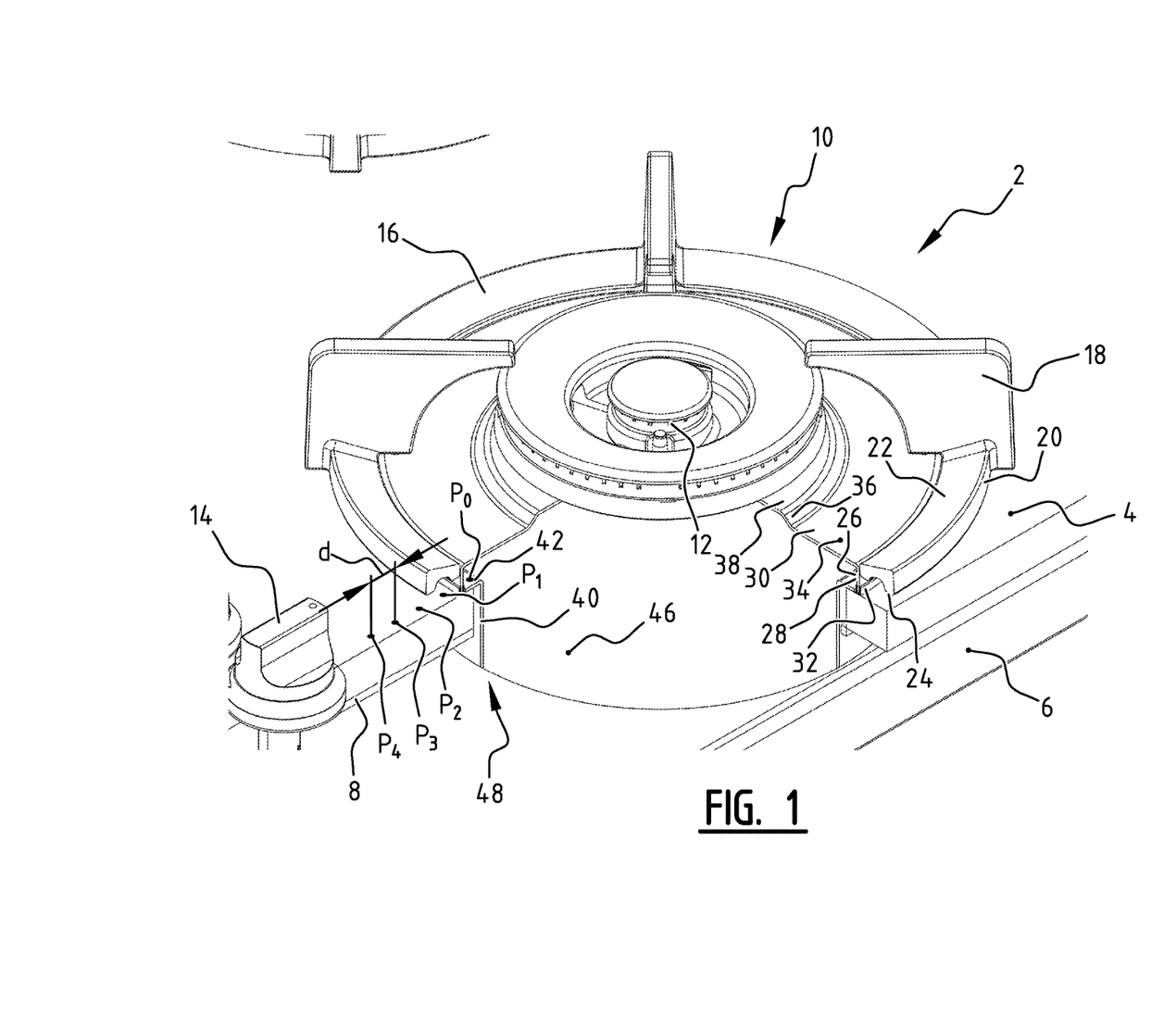
FIG. 1 shows the burner module according to the invention in a worktop.

Burner space 46 is located below burner 10 and above carrier 6 within the space defined by opening 48 in worktop 4 for burner module 2. Bush 40 screens worktop 4 in lateral direction from burner space 46. In the shown embodiment heat shield 30 screens burner space 46 on the upper side and in the shown embodiment to some extent also in lateral direction with flange 28. Radiant heat from burner 10 with the stated components hereby does not reach worktop 4. A complete screening of worktop 4 from burner space 46 is realized by also having flange 42 of bush 40 connect against flange 28 of heat shield 30 or against sealing ring 32 thereof, whereby heat transfer by convection is also significantly reduced.

In the shown embodiment flange 42 rests on worktop 4 (FIG. 2) and no further attachment is required. Gas outlet 50 from carrier 6 supplies gas to gas ring or outlet 10. The ignition mechanism for gas ring 12 is controlled via connection 52. In the shown embodiment heat plate 30 is fixed with a screw or bolt to carrier 6 following fitting thereof. Carrier 6 rests with adjusting screws against the underside of worktop 4, in the shown embodiment against the underside of heat-conductive plate 8.

Figure 3:
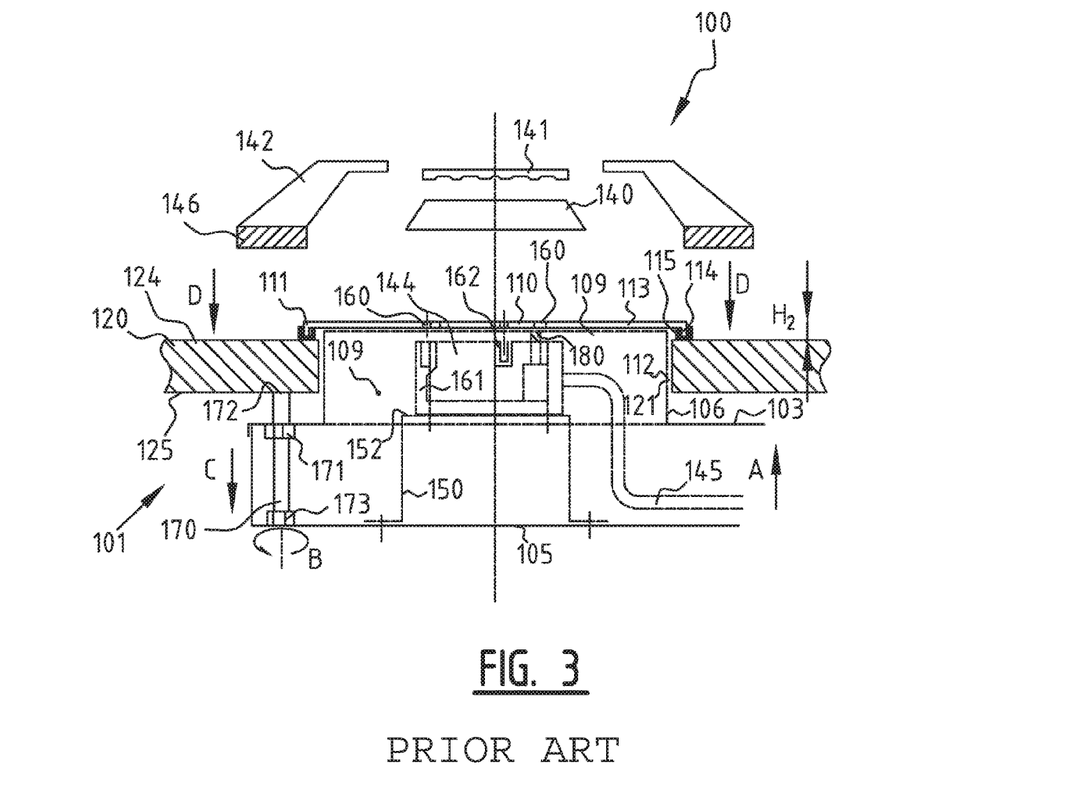
FIG. 3 shows a conventional burner module.

A conventional burner 100 (FIG. 3) is for instance shown in WO 2010/143952 and comprises a substructure unit 101 with a bottom plate 105 in which bush 106 is fixedly attached on the top side 103 of substructure unit 101. Burner space 109 is located in bush 106. Heat plate 111 is arranged on the upper side of burner space 109. Substructure unit 101 is as it were suspended from heat plate 111 which supports on worktop 120. Adjusting bolts 170 define the distance between substructure unit 101 and worktop 120, wherein adjusting bolts 170 are screwed into nuts 171 attached to top plate 103 and wherein the end 172 of bolts 170 comes up against the lower surface 125 of worktop 120 after rotation of adjusting bolt 170 in direction B. Rotation of adjusting bolts 170 urges substructure unit 101 downward in direction C, wherein heat plate 111 is pulled downward in direction D. Burner module 100 is placed here substantially from below in direction A through opening 121 in worktop 120. Heat shield 111 rests on upper surface 124 of worktop 120. Flame distributor 140 and burner cover 141 are arranged from above, as is pan support 146 with supports 142. Heat plate 111 is screwed fixedly onto burner body 144 with bolts in holes 160 and bolt holes 162 on peripheral edge 161. Heat plate 111 is arranged with U-shaped seating profile 115 on worktop 120. Connection 145 provides an operative connection between carrier 101 and the outlet of burner module 100. Walls 112 of bushes 106 are provided with some clearance in holes 121.

In the shown embodiment height $H_1$ (FIG. 1) of burner module 2 according to the invention is about 3 mm higher than height $H_2$ (FIG. 3) of conventional burner module 100, wherein height $H_2$ amounts to about 10 mm.

Figure 4:
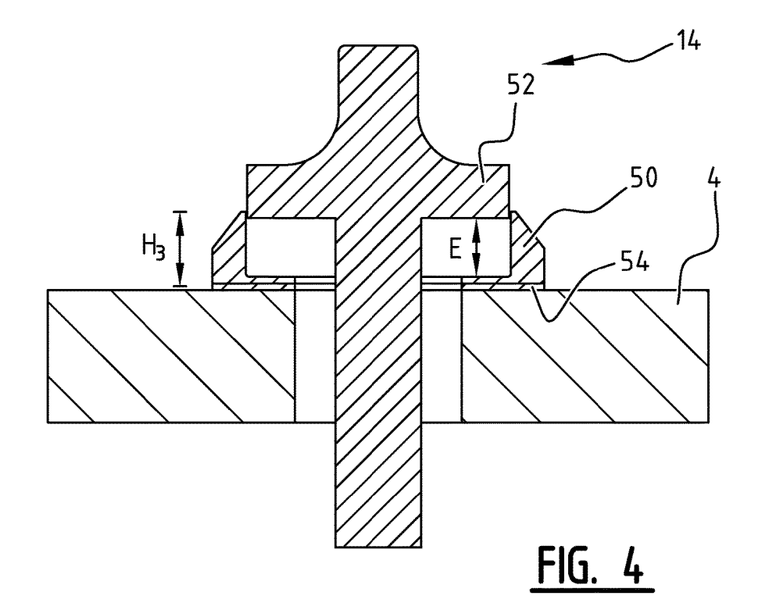
FIG. 4 shows a control knob for the burner module of FIG. 1 according to the invention.
Figure 5:
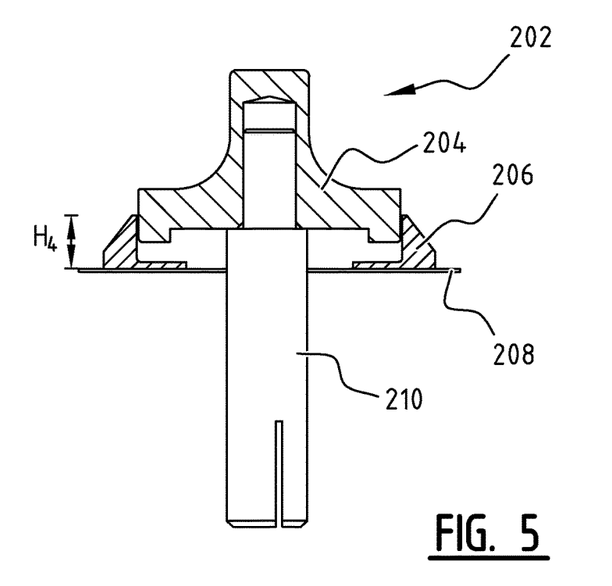
FIG. 5 shows a conventional control knob.

Knob 14 (FIG. 4) is provided with a housing 50 in which knob 52 is movable in the direction E. In the shown embodiment housing 5 is connected to worktop 4 using an adhesive or other connecting layer 54. When pressed in, knob 52 is moved downward and the safety mode of burner module 2 is changed and ignition can take place. When knob 52 is rotated, gas will be supplied and burner module 2 will enter into an active mode. Housing 50 is given a height H3 which is 1 to 10 mm, preferably 2 to 8 mm greater than height H4 of conventional control knob 202 (FIG. 5) comprising knob 204, housing 206, connecting element 208 and contact pin 210.

Figure 2:
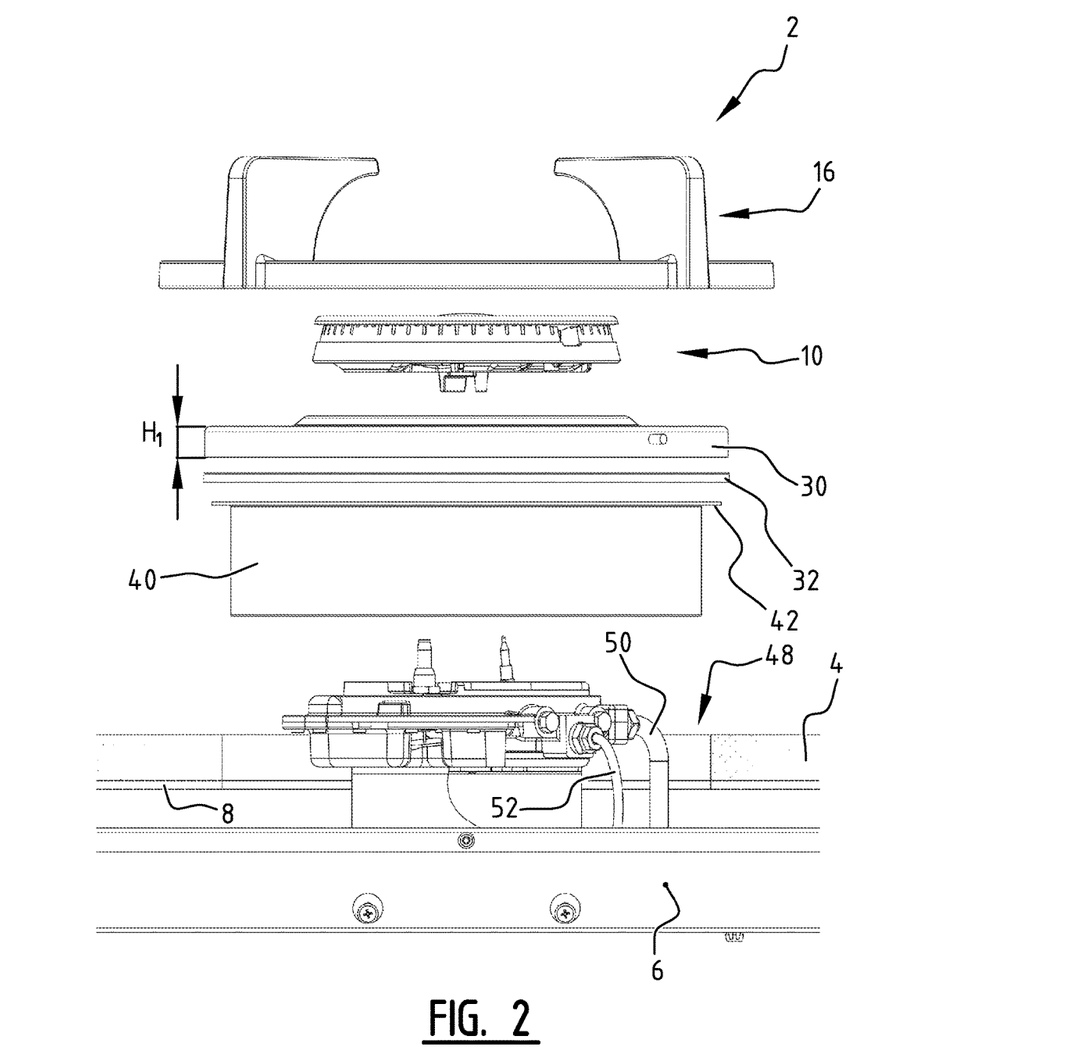
FIG. 2 is an exploded view of the burner module of FIG. 1.
Figure 6A:
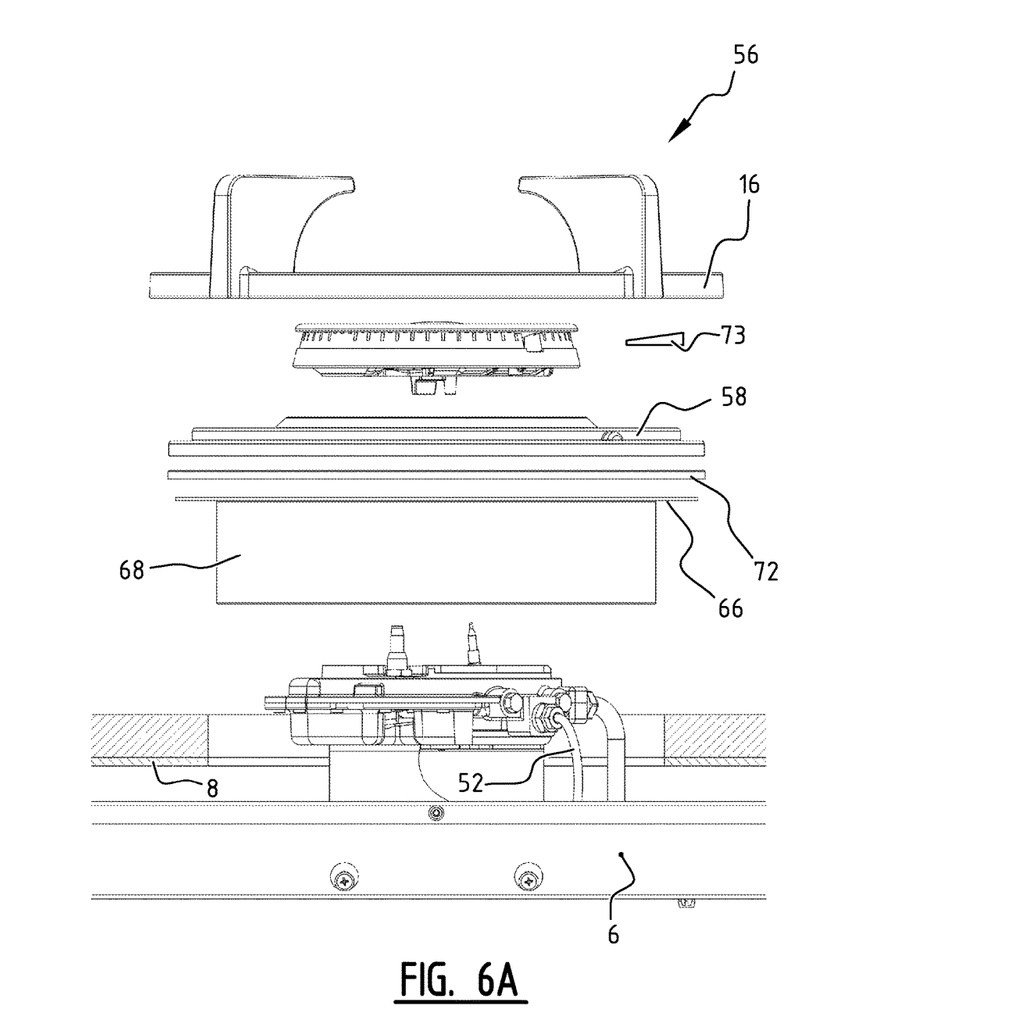
FIGS. 6A-B show an alternative embodiment of the burner module of FIG. 1 according to the invention.
Figure 6B:
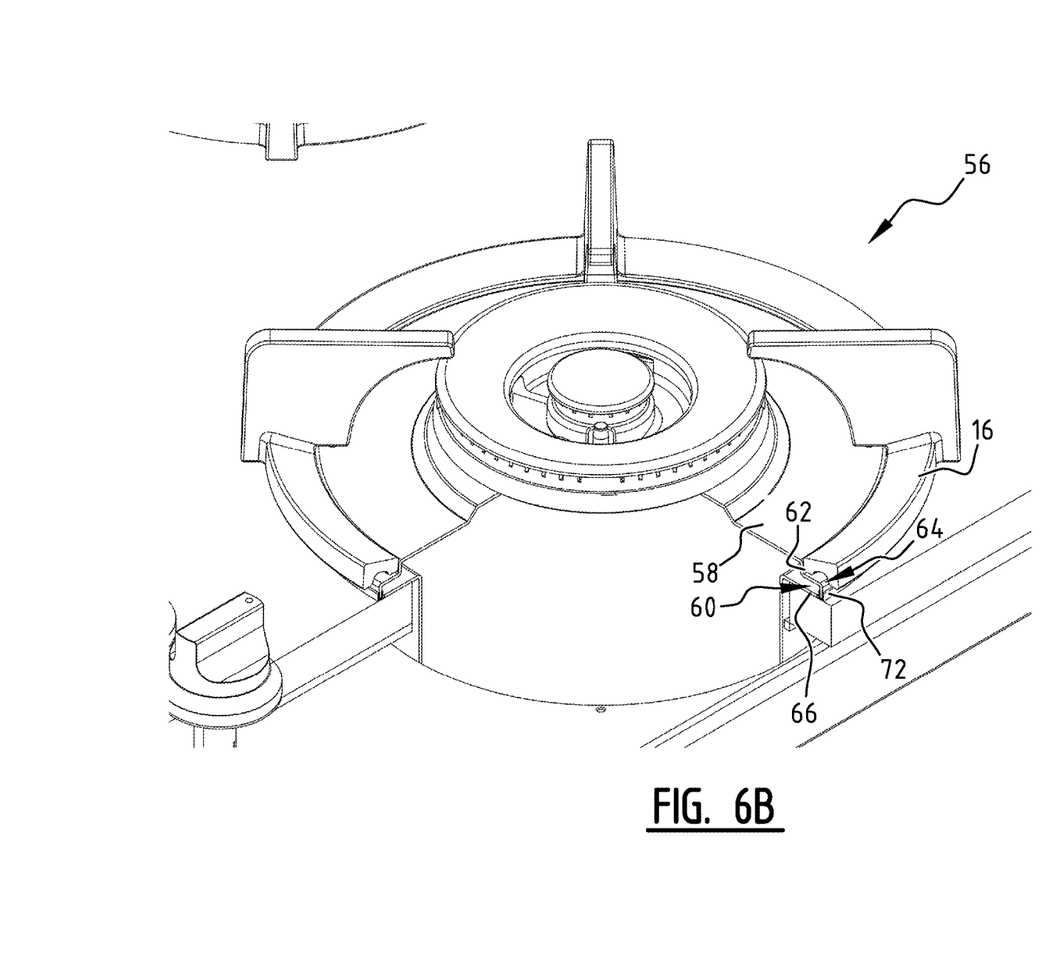

Alternative burner module 56 (FIGS. 6A and B) is largely the same as burner module 2 of FIGS. 1 and 2. Only the differences will therefore be discussed below. In the alternative embodiment of burner module 56 heat shield 58 is provided with additional edge 60 comprising a first bent portion 62 and a second bent portion 64. In the shown embodiment pan support 16 rests with an inner contact surface on additional edge 60. Also provided in the shown embodiment is the lengthened flange 66 of bush 68 which, following assembly, lies against sealing ring 70, and thereby against flange 72 which extends substantially vertically downward from bent portion 64. A closed contour is once again hereby provided for burner space 46, and heat transfer from pan support 16 to worktop 4 is further avoided. Also provided is fixation pin 73 for fixing pan support 16. Pin 73 can optionally also be applied to other embodiments according to the invention.

Figure 7:
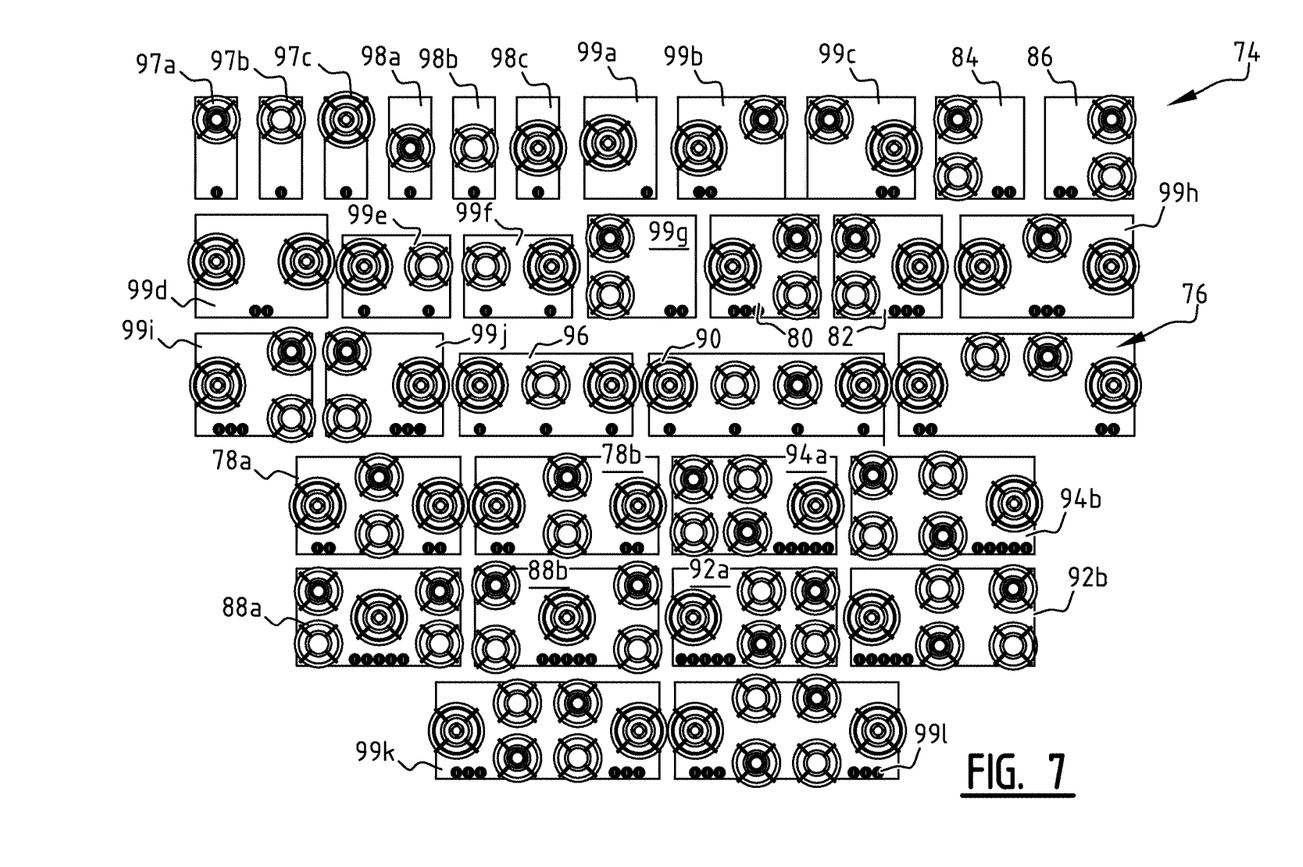
FIG. 7 shows a view of first configurations for a cooker or hob with a burner module according to the invention.

Burner module 2 can be provided in modular manner such that diverse configurations can be obtained for cooker 74 (FIG. 7). Such different configurations can for instance be based on different types of burner, for instance the 2, 3 and 5 kW types, and the number of gas rings 12 can also be varied from for instance one to five as shown in configurations 76, 78 a,b, 80, 82, 84, 86, 88 a,b, 90, 92 a,b, 94 a,b, 96, 97a, 97b, 97c and 98 a-c, 99 a-l, and assembled from such modular burner modules 2. Other configurations are of course expressly also possible.

Burner module 6 is preferably assembled in a controlled environment. If desired during use, or alternatively also in a controlled environment such as in a factory, burner module 2 is preferably attached to the underside of worktop 4 using a number of adjusting screws. Control knobs 14, heat shield 30 and pan supports 16 are then arranged from the upper side of worktop 4. Recesses or openings 48 are provided on worktop 4 prior to placing of burner module 2 therein. After placing of burner module 2 as a unit on the worktop a gas connection is connected to the inlet, after which burner module 2 is ready for use. The assembly of burner module 2 is described in more detail in WO 2010/143952, wherein however for burner module 2 according to the present invention bush 40 is placed loosely with flange 42 on the upper edge of worktop 4. Together with heat shield 30 a closed contour for burner space 46 is hereby realized, in any case in lateral direction, for burner module 2 according to the invention.

In an experiment burner module 2, 56 was compared to conventional burner module 100 in respect of temperature increases and temperature differences in worktop 4 during use of burner module 2, 56, 100. Temperatures were measured at five locations $P_0$, $P_1$, $P_2$, $P_3$ and $P_4$ (FIG. 1, with results in FIG. 8 for module 2 on the left-hand side and for module 100 on the right-hand side). The mutual distances between $P_1$, $P_2$, $P_3$ and $P_4$ amount to about 20 mm. The burner was turned on for 120 minutes, or two hours, wherein the temperature ranges were measured and shown in FIG. 8. Shown on the left-hand side of the figure is the temperature curve for module 2 of FIG. 1 according to the invention, and on the right-hand side for module 100 as conventional reference. Shown in the following table are values measured at different points in time for new module 2, 56 compared to old module 100.

Figure 8:
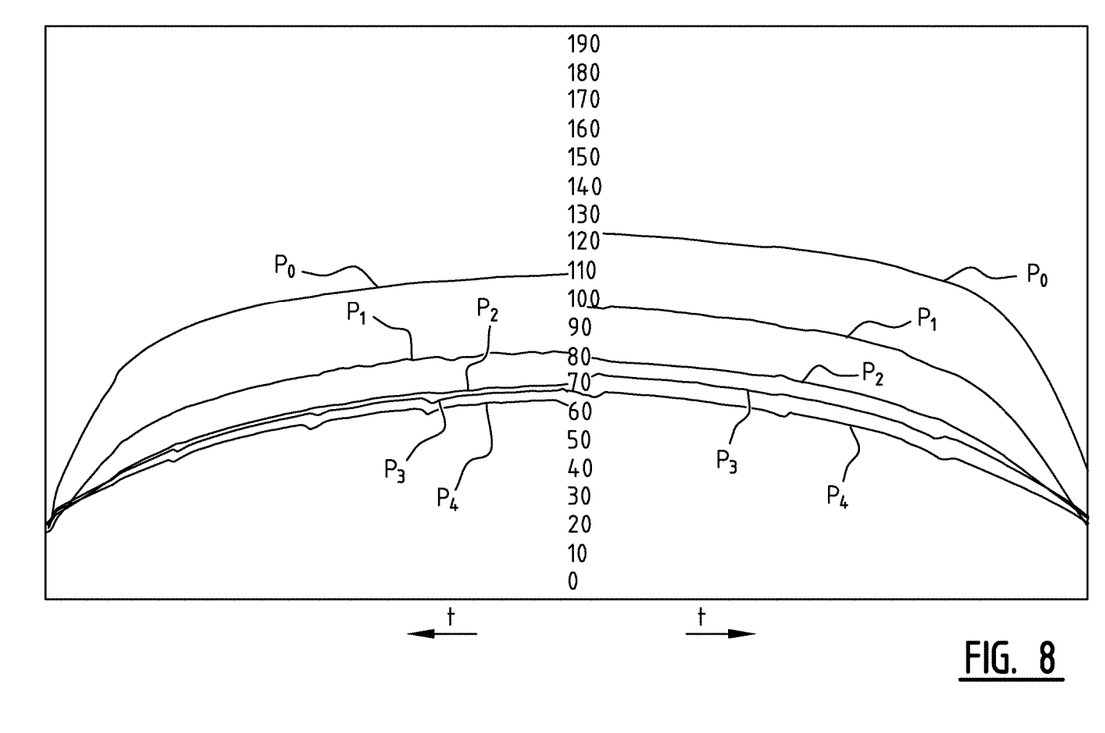
FIG. 8 shows an experimental result.

| Temp. (C.) Location | t = 30 min. new | t = 30 min. old | t = 60 min. new | t = 60 min. old | t = 90 min. new | t = 90 min. old | t = 120 min. new | t = 120 min. old |
|---|---|---|---|---|---|---|---|---|
| P1 | — | — | — | — | — | — | 68 | 77 |
| P2 | — | — | — | — | — | — | 60 | 76 |
| P3 | 43 | 50 | 53 | 60 | 54 | 65 | 58 | 66 |
| P4 | 39 | 44 | 50 | 53 | 50 | 61 | 55 | 62 |
| P5 | 33 | 37 | 43 | 46 | 45 | 53 | 52 | 53 |

Shown clearly in the figure is the effect of the combination of improved heat shield 30 and bush 40 in that the temperatures at all five positions are considerably lower, particularly the temperature at positions $P_0$ and $P_1$. Also clearly shown is a reduction in the temperature difference, so that the stresses caused by the temperature difference in worktop 4 are greatly reduced. Less damage will hereby be caused to worktop 4 during use of burner module 2. The experiment clearly demonstrates the surprisingly great effect of the modification of heat shield 30 in combination with bush 40.

Figure 9:
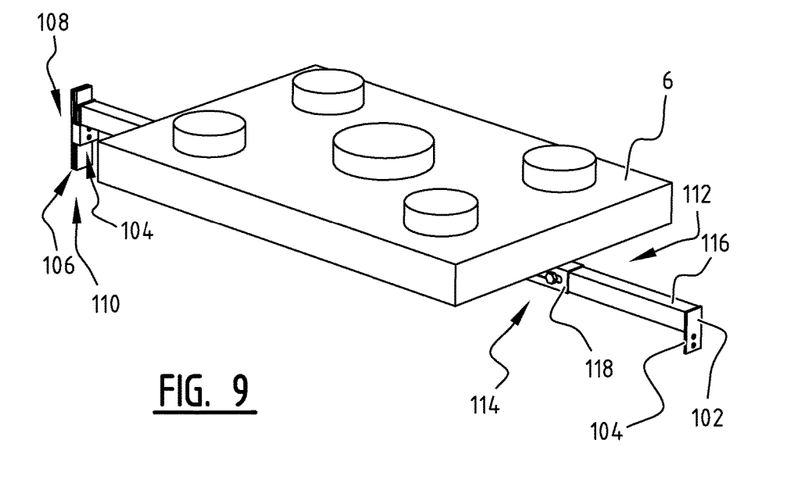
FIGS. 9-12 show alternative embodiments for the carrier.

In an embodiment carrier 6 is also provided with hooks/supports 102 (FIG. 9) with which carrier 6 is attachable to a side wall. This further reduces the load on worktop 4. In the shown embodiment support 102 comprises centering pin 104, guide 106, hook/slide 108 and closing cover 110. Arm 112 of support 102 is optionally provided with extending mechanism 114 and comprises a first arm part 116 and second arm part 118.

Figures 10, 11:
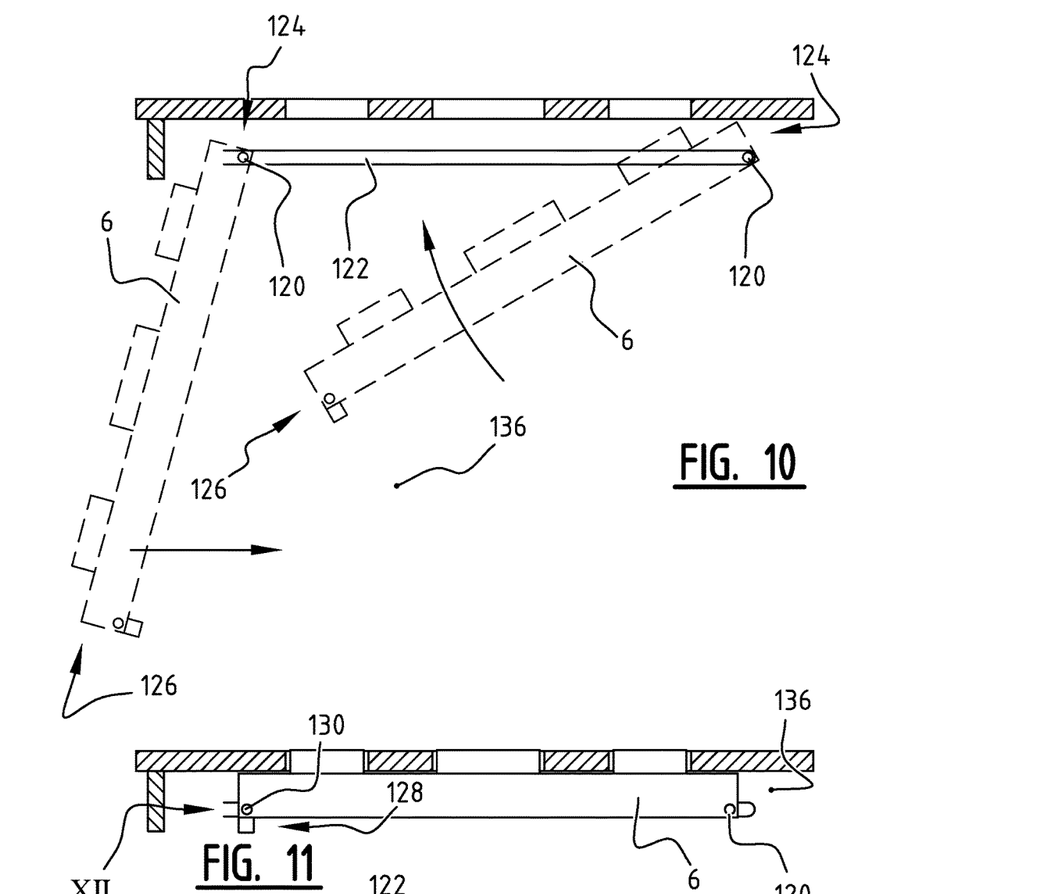
Figure 12:
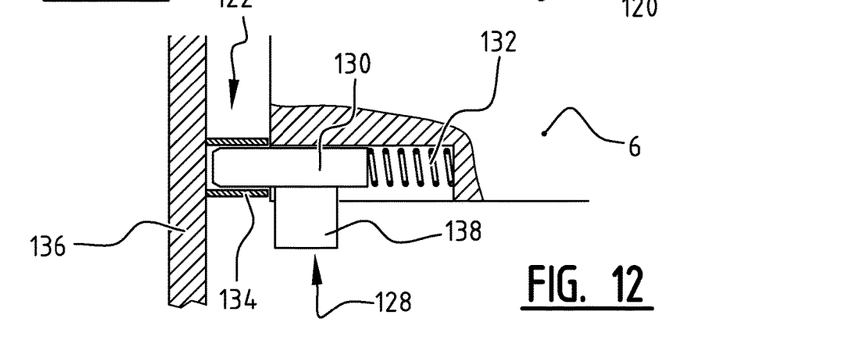

In an alternative embodiment carrier 6 is provided with the guides 120 (FIGS. 10 and 11) which are slidable in wall guides 122. This further reduces the load on worktop 4. First outer end 124 of guide 120 is pushed into wall guide 122 when carrier 6 is arranged. In the shown embodiment carrier 6 is then moved upward and second outer end 126 is fixed in or on wall guide 122 or other fixing means, for instance with pin-spring mechanism 128 (FIG. 12), wherein outer end 126 with pin 130 is pressed by means of spring 132 into holder 134 in side wall 136. Operation can be performed via handle 138.

The present invention is by no means limited to the above described preferred embodiments thereof. The rights sought are defined by the following claims, within the scope of which many modifications can be envisaged. Although the invention is specifically advantageous when used for the purpose of gas burners, other applications are also possible, such as electrical or combinations thereof with gas.

The invention claimed is:

1. Burner module for a cooker or hob, comprising:
   a carrier arranged under a worktop of the cooker and provided with a gas inlet and a gas outlet;
   a burner operatively connectable to the carrier;
   a heat shield disposed under the burner; and
   a bush provided with a flange arrangeable in an opening in the worktop, wherein the flange rests on or in the worktop,
   wherein the bush and the heat shield laterally enclose a volume between a top surface of the worktop and a top surface of the carrier to form a burner space under the burner during use.

2. Burner module as claimed in claim 1, wherein the bush and the heat shield are configured such that the burner space is screened laterally from the worktop.

3. Burner module as claimed in claim 2, wherein a substantially horizontal surface of the heat shield is provided at a distance relative to the surface of the worktop.

4. Burner module as claimed in claim 1, wherein a substantially horizontal surface of the heat shield is provided at a distance relative to the surface of the worktop.

5. Burner module as claimed in claim 4, wherein the distance lies in the range of 10-20 mm.

6. Burner module as claimed in claim 4, wherein the distance lies in the range of 11-18 mm.

7. Burner module as claimed in claim 4, wherein the distance lies in the range of 12-15 mm.

8. Burner module as claimed in claim 1, wherein the heat shield is provided with an additional edge on or close to the outer edge of the heat shield.

9. Burner module as claimed in claim 8, wherein the additional edge is configured such that in use it is provided under at least a part of a pan support.

10. Burner module as claimed in claim 1, wherein the burner is operatively connected to a control knob.

11. Burner module as claimed in claim 10, wherein the control knob is provided with a housing which extends to a height relative to the worktop.

12. Burner module as claimed in claim 1, wherein the carrier is provided with a support or guide configured for supporting attachment to a wall.

13. Burner module as claimed in claim 1, wherein the bush and the heat shield laterally enclose a burner space under the burner during use, wherein the bush and the heat shield are configured such that the burner space is screened laterally from the worktop, wherein a substantially horizontal surface of the heat shield is provided at a distance relative to the surface of the worktop, wherein the heat shield is provided with an additional edge on or close to the outer edge of the heat shield and wherein the additional edge is configured such that in use it is provided under at least a part of the pan support.

14. Method for manufacturing a cooker or hob, comprising of:
   providing a worktop;
   arranging a number of openings in the worktop;
   arranging in at least one of the number of openings a burner module as claimed in claim 1, wherein the flange of the bush rests during use on or in the worktop; and
   connecting a burner module.

15. Method as claimed in claim 14, wherein the burner module is inserted through the worktop from below.

16. Method as claimed in claim 14, wherein the heat shield is connected to the carrier such that the burner module is positioned relative to the worktop.

17. Method as claimed in claim 14, further comprising of attaching the carrier to a side wall.

18. Cooker or hob provided with a burner module comprising:
   a carrier arranged under a worktop of the cooker and provided with a gas inlet and a gas outlet;
   a burner operatively connectable to the carrier;
   a heat shield disposed under the burner; and
   a bush provided with a flange arrangeable in an opening in the worktop, wherein the flange rests on or in the worktop,
   wherein the bush and the heat shield laterally enclose a volume between a top surface of the worktop and a top surface of the carrier to form a burner space under the burner during use.

19. Cooker or hob as claimed in claim 18, wherein at least some of the burner modules are provided with a pan support.

* * * * *